United States Patent Office 3,334,074
Patented Aug. 1, 1967

3,334,074
POLY(INDOPHENINES) FROM THIOPHENES AND 5,5'-BIISATINS
Isaac J. Levine, East Brunswick, N.J., assignor to Union Carbide Corporation, a corporation of New York
No Drawing. Filed July 12, 1963, Ser. No. 294,728
14 Claims. (Cl. 260—79.7)

This invention relates to polymers of indophenine. More particularly it relates to polymers of indophenine derived from thiophenes and 5,5'-biisatins.

The reaction of thiophene with isatin in the presence of sulfuric acid to produce indophenine has been known for many years and is the basis for a qualitative color test for thiophene. The reaction is shown in the equation below.

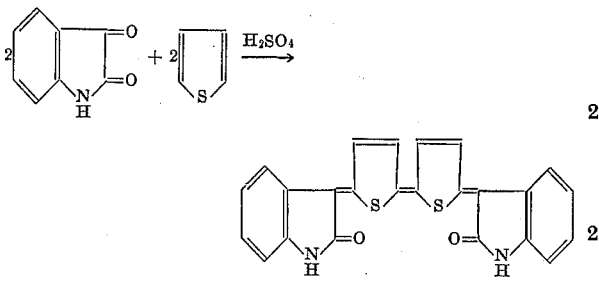

Indophenine exhibits a deep blue color and is stable at ambient temperatures of about 25° C. but decomposes when heated. It is insoluble in water and benzene but somewhat soluble in ethyl alcohol, and diethyl ether and common organic solvents.

It is a object of this invention to provide a heat stable polymeric form of indophenine. It is a further object to provide an insoluble polymeric form of indophenine which cannot be attacked by contact with solvents.

It has been found by reacting biisatins with thiophenes in the presence of sulfuric acid that insoluble polymers of indophenine, poly(indophenines), exhibiting good heat stability are obtained. This condensation polymerization is made possible by choosing derivatives of isatin coupled in the 5 position thus affording compounds which are bifunctional with respect to the reaction with thiophenes. The simplest example is that of 5,5'-biisatin.

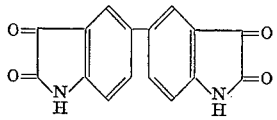

The 5 positions of the two benzene rings may also be linked by a divalent group as for example in

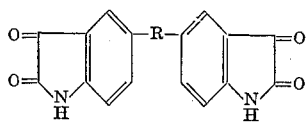

wherein R is a divalent radical such as

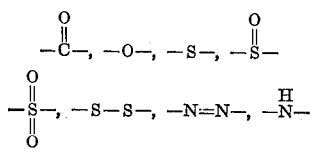

or one derived from aliphatic or cycloaliphatic hydrocarbons having up to 8 carbon atoms, or aromatic hydrocarbons containing 6 to 10 carbon atoms. Examples of specific aliphatic groups are straight chain alkylene groups such as methylene, ethylene, trimethylene, tetramethylene, pentamethylene, hexamethylene, heptamethylene, and octamethylene groups, branched alkylene groups such as isopropylene, isobutylene, t-butylene, isopentylene, neopentylene, isohexylene, 2,2-dimethylbutylene, isoheptylene, 2,2-dimethylpentylene, isooctylene and 2,2,4-trimethylpentylene groups and divalent radicals derived from such unsaturated hydrocarbons such as ethylene, isopropylene, propylene, butylene, isobutylene, amylene, butylethylene, heptylene, and octylene.

Cycloaliphatic groups include cyclopropylene, cyclobutylene, cyclopentylene and cyclohexylene groups.

Examples of aromatic divalent radicals are those derived from benzene, toluene, o-xylene, m-xylene, p-xylene, ethylbenzene, isopropylbenzene, pseudocumene, mesitylene, and durene.

Thiophenes which can be employed in this polymerization with biisatins are represented by the formula

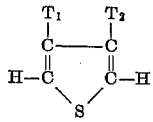

wherein $T_1$ and $T_2$ can be the same or different and can be hydrogen, monovalent organic radicals derived from saturated and unsaturated, branched and unbranched, aliphatic hydrocarbons containing up to 18 carbon atoms, saturated and unsaturated cycloaliphatic hydrocarbons containing up to 8 carbon atoms, aromatic hydrocarbons containing 6 to 10 carbon atoms, halogens including F, Cl, Br and I, carboxy, alkyl carboxy, formyl, alkyl formyl, alkoxy, acyl and nitro groups.

Examples of aliphatic substituted thiophenes include:

3-methylthiophene
3,4-dimethylthiophene
3-ethylthiophene
3,4-diethylthiophene
3-methyl-4-ethylthiophene
3-propylthiophene
3,4-dipropylthiophene
3,4-diisopropylthiophene
3,4-di-n-butylthiophene
3,4-diisoamylthiophene
3-allylthiophene
3-isopropenylthiophene
3,4-diisopropenylthiophene
3-methyl-4-allylthiophene and
3-methyl-4-isopropenylthiophene.

Examples of cycloaliphatic substituted thiophenes are 3-cyclobutylthiophene, 3-cyclopentylthiophene, 3-cyclohexylthiophene and 3,4-dicyclopentylthiophene.

Examples of aromatic substituted thiophenes are 3-phenylthiophene and 3,4-diphenylthiophene.

Examples of halogenated thiophenes which can be used include 3-chlorothiophene, 3-bromothiophene, 3-iodothiophene, 3,4 - dichlorothiophene, 3,4 - dibromothiophene, 3,4-diiodothiophene, 3-chloro-4-bromothiophene and others.

Representative examples of carboxy and alkyl carboxy substituted thiophenes include 3-carboxythiophene, 3,4-dicarboxythiophene, 3 - thienylacetic acid, 3,4 - thienyldiacetic acid, 3 - methyl - 4 - carboxythiophene, 3-methyl-4-thienylacetic acid and others.

Examples of formylated thiophenes useful in the formation of poly(indophenines) include 3-thiophenealdehyde, 3,4 - thiophenedialdehyde, 3 - methyl - 4 - thiophenealdehyde, 3-thiopheneacetaldehyde and others.

Examples of alkoxy substituted thiophenes are 3-methoxythiophene, 3,4 - dimethoxythiophene, 3 - ethoxythiophene and others.

Examples of acylated thiophenes are 3-acetylthiophene, 3,4 - diacetylthiophene, 3 - propionylthiophene and others.

Examples of nitrated thiophenes include 3 - nitrothiophene, 3,4 - dinitrothiophene, 3 - methyl - 4 - nitrothiophene, 3 - nitromethylthiophene, bis(3,4 - nitromethyl) thiophene and others.

The poly(indophenine) resulting from the reaction of a biisatin with thiophenes has the structure shown by the repeating unit below

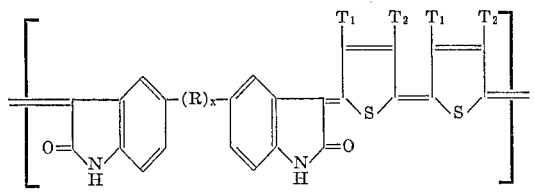

wherein R is as defined above, $x$ is an integer having values of 0 to 1 and $T_1$ and $T_2$ are as defined above.

A preferred form of this polymer is one produced from the reaction between thiophenes and 5,5'-biisatin or 5,5'-methylenebiisatin. The repeating unit of the polymer obtained with the latter is ($T_1$ and $T_2$ being as above defined):

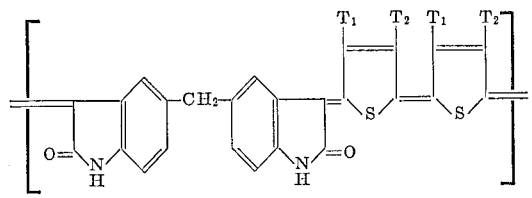

Although concentrated sulfuric acid is a preferred acid, others which may be used in this polymerization include mixtures of sulfuric and acetic acids, sulfuric and nitric acids and the like.

The acid serves as a solvent or reaction medium as well as a condensation catalyst. The amount used is always in excess over stoichiometric quantities and is, therefore, not critical.

This polymerization may be carried out in a temperature range of 0° C. to 100° C. A range of about 20° C. to 30° C. is preferred but is not critical. Atmospheric pressure is the preferred reaction pressure but superatmospheric or subatmospheric pressures can be used also.

The poly(indophenines) described in this invention are particularly useful as pigments because of their intense blue color and stability both to temperature and solvent attack. They have been subjected to temperatures as high as 500° C. without melting or decomposing. This unusual thermal stability can also be exploited in the fabrication of heat resistant coatings, fittings and couplings. Essentially complete insolubility in all common organic solvents was observed including, aliphatic hydrocarbons such as hexane, heptane, octane, isooctane, decane and paraffin-base motor oil, aromatic hydrocarbons such as benzene, toluene, and mixed xylenes, and chlorinated hydrocarbons such as carbon tetrachloride, ethylene dichloride, and trichloroethylene, as well as in acids such as hydrochloric acid, sulfuric acid and acetic acid.

The conjugated double bond structure of these poly(indophenines) also may be used in the fabrication of semiconductors. Although the sulfur atom has been proved to be isosteric with a —CH=CH— group, it may be desired that the conjugated effect be modified by desulfurization of the thiophene moieties leaving linear conjugated double bonds between the 5,5'-biisatin segments as shown below

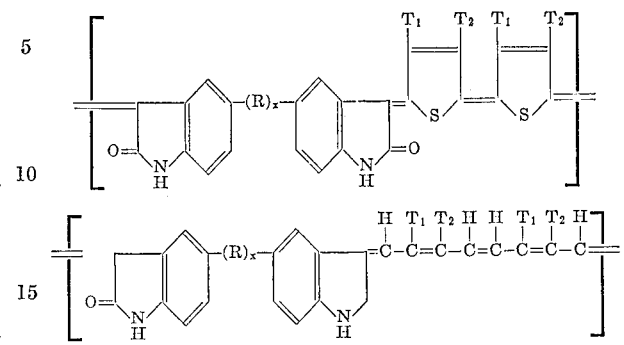

wherein R, $x$, $T_1$ and $T_2$ are as indicated above. Raney nickel or other desulfurization catalysts may be used to effect this conversion.

Specific examples of the preparation of poly(indophenines) are given below. All parts and percentages are by weight unless otherwise specified.

*Example 1.—Poly(indophenine) from thiophene and 5,5'-biisatin*

In a 100 ml. round-bottom three-neck flask fitted with a mechanical stirrer there was placed a solution of 1.46 g. of 5,5'-biisatin (0.005 mole) in 25 ml. of concentrated sulfuric acid. To this solution was added 0.84 g. of freshly distilled thiophene (0.01 mole). The mixture was mechanically stirred at 25° C. for five minutes during which time the contents of the flask became dark blue. The agitation was stopped and the reaction mixture was poured onto ice contained in a beaker. After the ice had melted the mixture was centrifuged affording a dark blue, finely divided precipitate which was washed until a neutral reaction to litmus paper was observed with the wash water. Upon drying there was obtained 2.1 g. of poly(indophenine) representing a nearly quantitative yield. A sample was heated on a Fisher-Johns melting point apparatus up to 300° C. and on a heating block up to 500° C. without melting or decomposition. Solubility tests were negative in water, hexane, diethyl ether, carbon tetrachloride, benzene and other common organic solvents at attempted concentrations of 2%. Solubility was determined both by visual observation of the solvent after heating or agitation with the polymer and also by solvent evaporation afterwards. The poly(indophenine) was identified by the infrared spectrum of a KBr disc of the product.

*Example 2.—Poly(indophenine) from thiophene and 5,5'-methylenebiisatin*

In a 100 ml. round-bottom, three-neck flask fitted with a mechanical stirrer was placed a solution of 1.53 g. of 5,5'-methylenebiisatin (0.005 mole) in 25 ml. of concentrated sulfuric acid. The solution was agitated and 0.084 g. of thiophene (0.01 mole) added. Agitation was continued for 5 minutes at 25° C. during which time a dark blue product appeared. The agitation was stopped and the contents of the flask poured into a 250 ml. beaker containing ice. After the ice melted the mixture was centrifuged to obtain the dark blue, finely divided precipitate. This was washed repeatedly on a Buchner funnel until the wash water was neutral to litmus paper. After drying there was obtained 2.05 g. of poly(indophenine) (quantitative yield). There was no evidence of melting or decomposition up to 500° C. as determined with a Fisher-Johns melting point apparatus up to 300° C. and with a heated block up to 500° C. Solubility tests were negative in water, hexane, diethyl ether, carbon tetrachloride, benzene and other common organic solvents. The criteria for the solubility determination were the same as used in Example 1. The infrared spectrum of the product was consistent with that of a poly(indophenine).

It is preferred to employ approximately 1 mole of a biisatin with approximately 2 moles of a thiophene, i.e., substantially stoichiometric proportions, as shown in the preceding examples. Highest molecular weights are obtained when exactly stoichiometric amounts of reactants are taken. In cases where the stoichiometry is not exact, lower molecular weight polymers result. However, the reaction is not dependent upon a critical balance of reactants. Large excesses of either reactant can be tolerated provided economic factors and high product weight are not important considerations to the practitioner.

It is understood that numerous changes may be made in the present disclosure without departing from the spirit and scope of the invention as hereinafter claimed.

What is claimed is:

1. Poly(indophenines) having the repeating unit

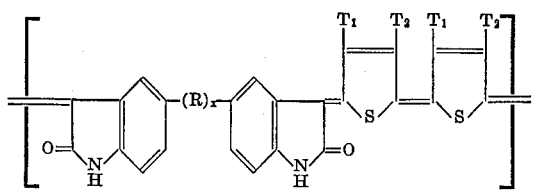

wherein R is a divalent hydrocarbon radical having up to 10 carbon atoms, $x$ is an integer having values of 0 to 1 and each of $T_1$ and $T_2$ is a member selected from the group consisting of hydrogen, halogen and monovalent hydrocarbon radicals having up to 10 carbon atoms.

2. The product claimed in claim 1 wherein $x$ has a value of 0 and $T_1$ and $T_2$ are each hydrogen.
3. The product claimed in claim 1 wherein R is a divalent aliphatic radical.
4. The product claimed in claim 1 wherein R is a divalent cycloaliphatic radical.
5. The product claimed in claim 1 wherein R is a divalent aromatic radical.
6. The product claimed in claim 1 in which $x$ is 0.
7. The product claimed in claim 1 in which $x$ is 1 and R is a methylene radical.
8. The product claimed in claim 1 in which $T_1$ and $T_2$ are each hydrogen.
9. The product claimed in claim 1 in which $T_1$ and $T_2$ are each methyl radicals.
10. The product claimed in claim 1 in which $T_1$ is chlorine and $T_2$ is hydrogen.
11. A method for making poly(indophenines) which comprises contacting a biisatin having the general structure

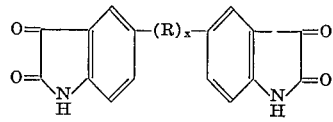

wherein R is a divalent hydrocarbon radical having up to 10 carbon atoms and $x$ is an integer having values of 0 to 1, with a thiophene having the structure

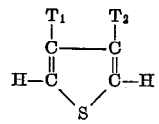

wherein each of $T_1$ and $T_2$ is a member selected from the group consisting of hydrogen, halogen and monovalent hydrocarbon radicals having up to 10 carbon atoms, in the presence of an acid selected from the group consisting of sulfuric acid, mixtures of sulfuric and acetic acids and mixtures of sulfuric and nitric acids, at a temperature of about 0° to 100° C., and recovering the poly(indophenine) reaction product.

12. The method claimed in claim 15 wherein the acid used is sulfuric acid.
13. The method claimed in claim 11 wherein the acid used is a mixture of sulfuric acid and acetic acid.
14. The method claimed in claim 11 wherein the biisatin and the thiophene are present in substantially stoichiometric proportions.

References Cited

Noller: Chemistry of Organic Compounds, W. B. Saunders Company, Philadelphia, Pa. (1951), p. 639.

JOSEPH L. SCHOFER, *Primary Examiner.*

H. WONG, *Assistant Examiner.*